United States Patent [19]
Hutchings

[11] Patent Number: 5,108,071
[45] Date of Patent: Apr. 28, 1992

[54] LAMINAR FLOW VALVE

[75] Inventor: Peter G. Hutchings, Rockaway, N.J.

[73] Assignee: South Bend Controls, Inc., South Bend, Ind.

[21] Appl. No.: 577,673

[22] Filed: Sep. 4, 1990

[51] Int. Cl.⁵ .................... F16K 31/06; F16K 1/4S
[52] U.S. Cl. ...................... 251/86; 251/282; 251/129.08; 251/129.17
[58] Field of Search ............ 251/282, 86, 129.08, 251/129.17

[56] References Cited

U.S. PATENT DOCUMENTS

| | | |
|---|---|---|
| 1,964,300 | 6/1934 | Perry et al. |
| 1,983,213 | 12/1934 | Brady et al. |
| 3,144,879 | 8/1964 | Baumann |
| 3,510,100 | 5/1970 | Makusay et al. ........... 251/86 X |
| 3,570,806 | 3/1971 | Sturman et al. .......... 251/282 X |
| 3,630,438 | 12/1971 | Bickford |
| 3,670,962 | 6/1972 | Johnston ................. 251/282 X |
| 3,985,333 | 10/1976 | Paulsen .................. 251/282 X |
| 4,237,925 | 12/1980 | Urushida |
| 4,278,234 | 7/1981 | Baumann |
| 4,283,041 | 8/1981 | Kujawski |
| 4,320,778 | 3/1982 | Baumann |
| 4,322,055 | 3/1982 | Baumann |
| 4,463,332 | 7/1984 | Everett |
| 4,493,474 | 1/1985 | Ohyama .................. 251/282 X |
| 4,501,299 | 2/1985 | Klimowicz et al. |
| 4,552,336 | 11/1985 | Pastrone |
| 4,558,844 | 12/1985 | Donahue, Jr. |
| 4,643,227 | 2/1987 | Suzuki et al. |
| 4,666,126 | 5/1987 | Tujimura et al. |
| 4,741,510 | 5/1988 | Baumann |
| 4,767,097 | 8/1988 | Everett et al. |
| 4,796,854 | 1/1989 | Ewing .................... 251/282 X |
| 4,889,148 | 12/1989 | Smazik ................... 251/282 X |

Primary Examiner—Arnold Rosenthal
Attorney, Agent, or Firm—James D. Hall

[57] ABSTRACT

A laminar flow control valve has a valve housing with an inlet and an outlet, an orifice plate, a poppet, an operating mechanism such as an electrically powered proportional solenoid, and a mechanism for realigning the poppet and orifice plate to maintain selected surfaces of those components in substantially parallel relation. The gaseous flow is throttled between respective parallel surfaces of the orifice plate and poppet such that the volumetric flow rate is linearly proportional to the pressure differential across the parallel surfaces. The poppet is mounted to a stem of the operating mechanism so as to be free to move in more than one plane relative to the orifice plate. In the embodiment illustrated, the poppet is free to swivel so that the metering surfaces "self-align" each time the valves close. The preferred embodiment of the invention utilizes a flat orifice plate and poppet. The poppet is attached to a stem of the operating mechanism by mechanical means. Other features include a pressure balancing arrangement which utilizes one or more diaphragms to desensitize the valve to pressure fluctuations.

17 Claims, 2 Drawing Sheets

LAMINAR FLOW VALVE

BACKGROUND AND SUMMARY OF THE INVENTION

This invention relates generally to control valves and, more specifically, to control valves for the precise metering of gaseous media between two substantially parallel surfaces in such a way that the volumetric flow rate is linearly proportional to the pressure differential across the metering surfaces. This flow condition is typically referred to as laminar flow.

The laminar flow volumetric flow rate/pressure differential relationship is described by the Hagen-Poiseuille Law as follows:

$$Q = \frac{Kh^3}{\mu} \Delta P$$

where
Q = volumetric flow rate
K = constant
h = distance between the plates,
μ = viscosity, and
ΔP = pressure differential across the metering surfaces.

This flow description is valid for relatively narrow flow passages and/or very small velocities. A measure of how applicable the Hagen-Poiseuille Law is to a given flow pattern is the Reynolds Number $$Re = U\rho\delta/\mu$$

where
Re = Reynolds Number
U = average velocity
δ = gap between the parallel surfaces
ρ = fluid density, and
μ = viscosity The critical Reynolds Number defining the transition between laminar and turbulent flow is approximately 2000. Therefore, the Hagen-Poiseuille Law is applicable for flow patterns having Reynolds Numbers of less than 2000. A typical Reynolds Number for a flow pattern of the type in which the present invention may be applied is approximately 5. This is clearly in the laminar flow region described by the Hagen-Poiseuille Law.

The prior art shows a number of devices for restricting the flow of liquid or gaseous media through a very narrow opening to produce a laminar flow pattern. U.S. Pat. No. 3,144,879 to Hans D. Baumann shows a device which uses two parallel surfaces separated by a distance which may be adjusted manually or as a function of the thermal expansion of a selected material. In the Baumann device, fluid enters through an input port into an annular channel which is sealed by two concentrically positioned O-rings. The O-rings are compressed between the upper surface of the main housing of the device and an adjustable plate which parallels this surface. An outlet port is provided just inside the outer O-ring seal to provide the fluid with a means of escape. The relatively narrow opening formed between the upper surface of the main housing and the adjustable plate in the area between the O-ring seals is effective to produce a laminar flow pattern through the device. The narrow gap may be adjusted by means of an adjusting screw which is threaded through the adjustable plate. A hand wheel is provided for turning the screw. Adjustment may also be attained by employing the force created by the difference in thermal expansion between two dissimilar metal parts.

U.S. Pat. Nos. 4,320,778; 4,322,055; and 4,278,234, also to Baumann, show variations of the device described in U.S. Pat. No. 3,144,879. The '234 patent shows a laminar flow restriction device in which the controlling gap between the metering surfaces is adjusted by a hydraulic amplifier interspaced between conventional linear motion-type pneumatic or hydraulic actuators. The '778 patent is a continuation-in-part of the '234 patent in which the laminar flow restriction device is adapted for use as an automatically operated small flow control valve. The '055 patent is also a continuation-in-part of the '234 patent, and describes additional embodiments of automatically operated small flow control valves which utilize the basic principles discussed in the preceding patents.

Other patents which show precisely regulating metering or control valves include U.S. Pat. Nos. 1,964,300; 1,983,213; 4,283,041; 4,552,336; 4,666,126; and 4,741,510. Also of interest to the particular embodiments illustrated and discussed below are U.S. Pat. Nos. 4,463,332 and 4,767,097 for an electrically operated proportional solenoid which are assigned to the assignee of the present invention.

An object of the present invention is to provide a laminar flow control valve of the type in which flow is throttled between two parallel surfaces, and in which the parallel surfaces are provided with a "self-aligning" feature.

Another object of the present invention is to provide a laminar flow control valve which may be easily and accurately controlled, calibrated and adjusted.

Yet another object of the present invention is to provide a laminar flow control valve which may be controlled, calibrated and adjusted by varying an electrical current, or by mechanical means without disassembly or direct access to the internal components of the valve.

Still yet another object of the present invention is to provide a laminar flow control valve having decreased sensitivity to line pressure variations.

These and other objects of the invention are attained in a control valve for precisely metering gaseous media which comprises a valve housing having an inlet and an outlet, an orifice plate, a poppet, an electrically-powered operating mechanism for positioning the poppet relative to the orifice plate, and a mechanism for aligning (or realigning) the poppet and the orifice plate when the valve is closed. The gaseous media is throttled between two parallel surfaces which define a portion of a flow path through the valve such that the volumetric flow rate is linearly proportional to the pressure differential across the parallel surfaces. The orifice plate is sealingly disposed in the flow path between the inlet and the outlet. The plate has a centrally located orifice and a first surface extending outwardly along the plate from the orifice. The poppet is disposed adjacent the orifice plate, and has a surface which extends adjacent and substantially parallel to the surface of the orifice plate. The operating mechanism positions the poppet relative to the orifice plate to open, close and meter the flow of the gaseous media through the valve by controlling the width of the gap between the two parallel surfaces. The valve is constructed so as to allow the surfaces to "self-align" each time the valve is closed so as to maintain the surfaces in a substantially parallel relation.

In the specific embodiment described in detail, the orifice plate is fixedly mounted in the flow path, and the poppet is attached to the operating mechanism such that the metering surface of the poppet is free to move in more than one plane relative to the metering surface of the orifice plate. In the preferred embodiment, the orifice plate comprises a substantially flat, disc-like plate sealingly mounted to the valve housing along its periphery. An orifice is formed in the approximate center of the plate. In this embodiment, the poppet has a substantially flat, disc-like portion disposed adjacent the orifice plate, and is attached to a movable stem extending from the operating mechanism. The poppet is attached to a spherical portion of the stem and is free to swivel relative to the stem and orifice plate. The swivel arrangement includes a spring disposed between the poppet and the spherical portion of the stem which tends to maintain the metering surface of the poppet in parallel relation to the metering surface of the orifice plate when the poppet is moved from a closed position to an open or metering position.

The preferred operating mechanism comprises an electrically powered proportional solenoid. The use of an electrically powered operator to precisely control the positioning of the poppet relative to the orifice plate offers advantages in terms of control and calibration of the valve.

The valve is also provided with a pressure balancing arrangement for counteracting the effects of pressure variation upstream or downstream of the metering surfaces on the relative positioning of the surfaces. The pressure balancing arrangement comprises one or more diaphragms operatively connected to the poppet and responsive to the pressure variations to generate forces which act in opposition to the forces exerted on the stem by the poppet in response to these same pressure variations.

The valve of the present invention is also provided with mechanical means for adjusting and/or calibrating the flow of gaseous media through the valve. The calibration mechanism is externally accessible so that the valve may be calibrated without disassembly or required access to the internal valve components. The valve may also be calibrated electrically by regulation and control of the current supplied to the electrically powered solenoid.

Other objects, advantages and novel features of the present invention will become apparent from the following detailed description of the invention when considered in conjunction with the accompanying drawings.

DETAILED DESCRIPTION OF THE DRAWINGS

Figure 1:
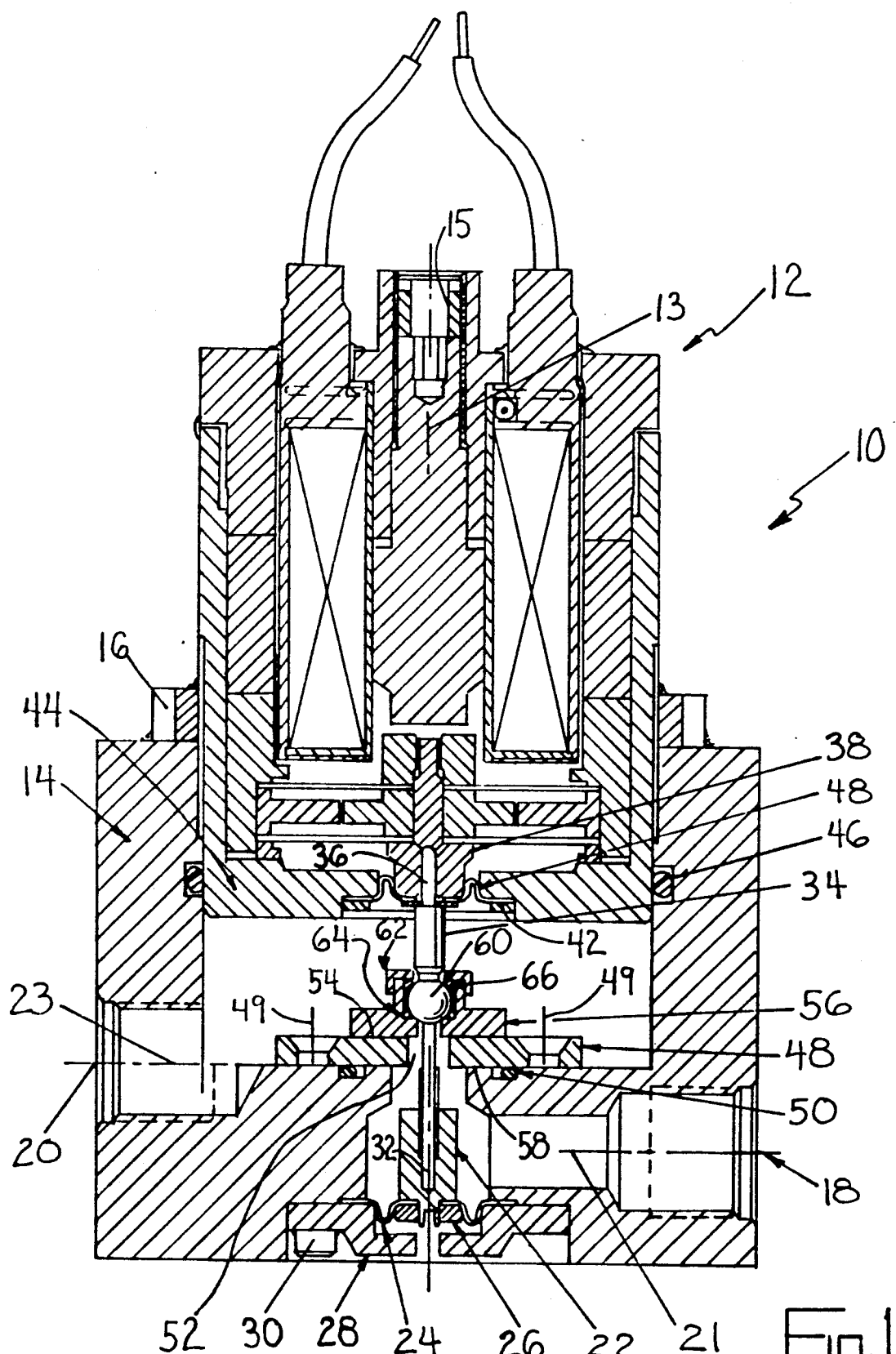
FIG. 1 shows a cross-sectional view of a control valve constructed in accordance with the present invention.

FIG. 1 shows a cross-sectional view of a control valve 10 which is constructed in accordance with the principles of the present invention. Valve 10 includes an adjustable linear motion proportional solenoid 12 which is secured within a valve housing 14 by a locking ring 16. A suitable solenoid 12 for the present application is described in U.S. Pat. No. 4,463,332 which is assigned to the assignee of the present invention. To the extent necessary for a full and complete understanding of the present invention, the subject matter of that patent is hereby incorporated into the present disclosure. A detailed description of the structure and operation of solenoid 12 will not be repeated here.

Housing 14 is provided with an inlet port 18 and an outlet port 20 for receiving and discharging the gaseous flow (the relative positioning of the inlet and outlet ports can, of course, be reversed). Between inlet 18 and outlet 20 is a flow path for gaseous media, which is defined by the valve housing and other components of valve 10 as more fully described below.

Adjacent inlet port 18, in the approximate center of control valve 10 is a lower stem 22 which is secured to a diaphragm 24 by lower stem retainer 26. Diaphragm 24, which is secured to valve housing 14 by diaphragm retainer 28 and cap screws 30, is provided for the purpose of compensating for the effect of undesirably high inlet side pressures, as will be discussed in additional detail below. Diaphragm 24 and valve housing 14 define inlet-side portion 21 of the flow path through control valve 10.

Lower stem 22 is provided with an internal bore 32 in which is secured a downwardly extending portion of upper stem 34. Upper stem 34 is also secured within bore 36 of armature retainer 38 which is part of solenoid 12. An upper diaphragm 40 is sealingly secured in position by diaphragm retainer 42 for pressure equalization purposes as described below, and to isolate the gaseous media flowing through the valve from the interior of solenoid 12. Diaphragm 40 and solenoid housing 44, which is sealed to housing 14 by O-ring 46 and housing 14, define an outlet-side portion 23 of the flow path through valve 10 in the particular embodiment of the invention illustrated in FIG. 1.

Valve 10 further includes an orifice plate 48 which is secured by screws (not shown) disposed in countersunk holes 49 to valve housing 14, and which is sealed to housing 14 by O-ring 50. Orifice plate 48 is provided with a central orifice 52, which defines a portion of the flow path, and an upwardly facing (as viewed in the embodiment illustrated in FIG. 1) surface 54 which extends outwardly from orifice 52. Immediately adjacent orifice plate 48 is valve poppet 56 which is provided with a downwardly facing (as viewed in the embodiment illustrated in FIG. 1) surface 58 which, in the closed position shown, abuts surface 54 of orifice plate 48. Poppet 56 is mounted to a spherical portion 60 of upper stem 34 by a press-fit poppet retainer 62. An O-ring seal 64 is provided to prevent the flow of the gaseous media around spherical portion 60 of stem 34. A poppet retainer spring 66 is provided as illustrated to help maintain the relative positioning of poppet 56 and spherical portion 60.

Valve 10 in FIG. 1 is shown in the closed position. When valve 10 is opened, upper stem 34 retracts upwardly to raise poppet 56, creating a narrow gap between surfaces 54 and 58. The narrow gap thus formed connects inlet portion 21 of the flow path to outlet portion 23 and allows fluid to flow through the valve. The dimensions of the gap (i.e., the spacing of surfaces 54 and 58) is maintained sufficiently narrow, as compared to the length of the flow path between the surfaces, to assure that the flow remains in the laminar region.

Surfaces 54 and 58 are relatively flat, planar surfaces which, when separated, stay substantially parallel to one another. In prior art valves, parallelism is maintained between similar surfaces by precise dimensioning of components of the assembly. Even when parts are dimensioned precisely, it is possible that wear, warpage, and other conditions may be encountered to cause such surfaces to vary from parallel relation. In the valve illustrated in FIG. 1, poppet 56 is free to swivel on spherical portion 60 of upper stem 34. Thus, when the valve is closed, surface 58 aligns precisely with surface 54. When stem 34 is retracted and poppet 56 is raised, this precise alignment is maintained by the stiction between stem portion 60 and poppet 56 created, at least in part, by spring 66. If, however, surfaces 54 and 58 do deviate from their parallel relationship during the course of fluid flow through valve 10, closing the valve serves to realign the surfaces.

The valve of FIG. 1 utilizes a direct acting proportional solenoid 12 to operate "self-aligning" parallel throttling metering surfaces 54 and 58. Adjustment of the gap between surfaces 54 and 58 is accomplished by varying the current flow to proportional solenoid 12. Calibration of current flow to a desired flow rate can be accomplished externally. The use of other control devices to compensate for flow variations due to temperature changes, fluid densities and other variables is also facilitated by the use of an electrically powered operating mechanism. Since the assembly is self-aligning and externally calibrated, precise tolerancing of the various components is not required.

As an alternative to (or in addition to) calibration by regulation of current flow to solenoid 12, a means of mechanical calibration is also provided. Control valve 10 may be externally calibrated by adjusting armature 13 by means of threaded adjusting mechanism 15. Adjusting mechanism 15 is externally accessible so that adjustments and calibration may be effected without disassembly or access to internal components of valve 10.

As mentioned above, diaphragms 24 and 40 are provided as pressure balancing mechanisms for counteracting the effects of pressure variations upstream or downstream, respectively, on the relative positioning of surfaces 54 and 58. In the event of a pressure increase upstream of valve 10, increasing pressure at the inlet port tends to force the gap between surfaces 54 and 58 to increase. However, diaphragm 24, which is connected to upper stem 34 by lower stem 22, compensates for this tendency by creating a pressure-induced force of equal magnitude, but opposite direction. Upper diaphragm 40 works in a similar fashion. Increasing back pressure at outlet 20 tends to force poppet 56 against orifice plate 48, decreasing the gap between surfaces 58 and 54, respectively. However, this same pressure increase on diaphragm 40 creates a force of equal magnitude and opposite direction which causes the poppet to maintain its original position.

Figure 2:
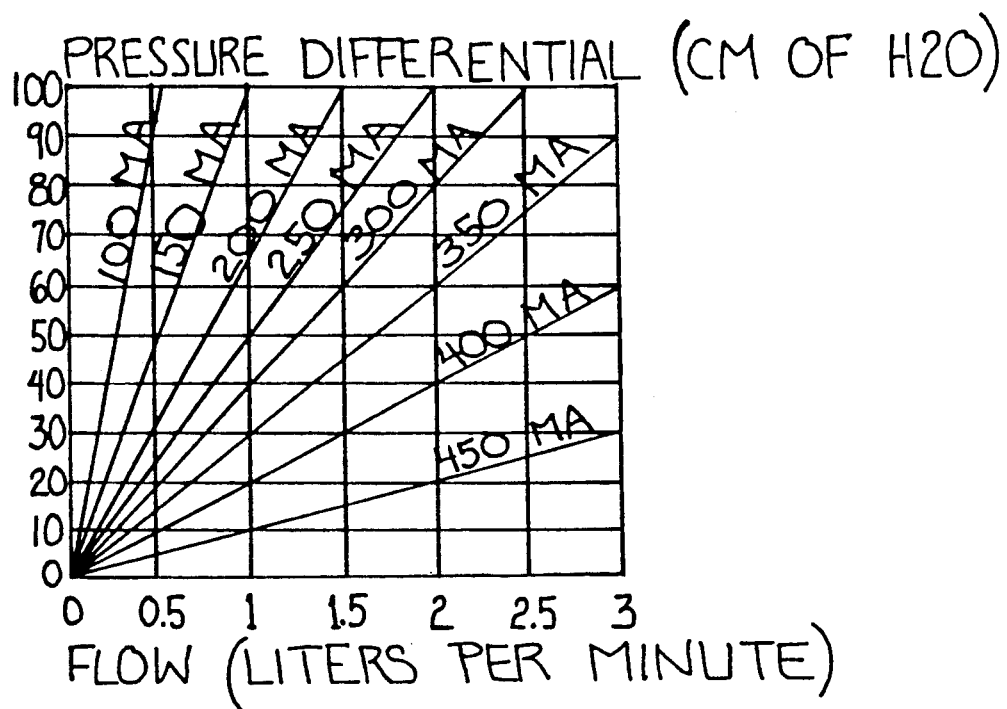
FIG. 2 graphically illustrates flow rate versus pressure differential at several current levels for the embodiments illustrated in FIG. 1.
Figure 3:
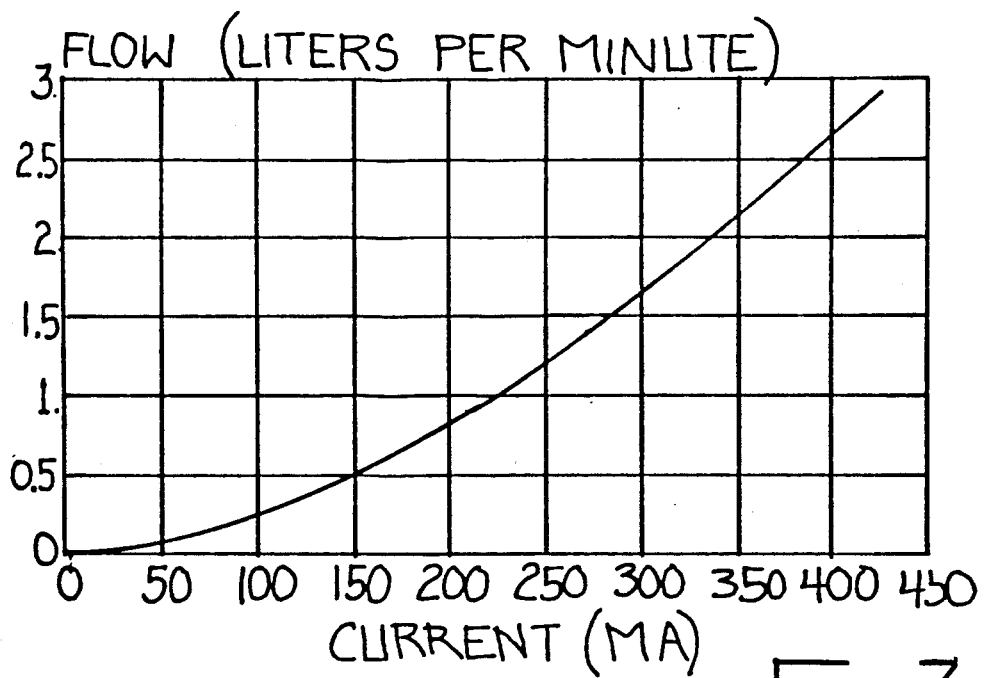
FIG. 3 illustrates an alternative mode of operation in which flow rate is proportional to the current input of the solenoid operator.

FIGS. 2 and 3 graphically illustrate the performance characteristics of the flat plate and valve illustrated in FIG. 1. FIG. 2 graphically illustrates the Hagen-Poiseuille Law discussed above. Energizing the solenoid operator with a constant electrical current creates a gap having a set width between the parallel metering surfaces of the poppet and orifice plate. Since flow is in the laminar region, flow rate is linearly proportional to the differential pressure across the surfaces. Operation of the solenoid at different current levels produces a family of curves as illustrated in FIG. 2. The positions of the curves in the family can be altered by the external mechanical calibration of each of the valves, as described above.

FIG. 3 illustrates an alternate mode of operation in which flow rate is proportional to the current input into the solenoid operator. As noted above, the position of the curve can be altered by external mechanical calibration.

From the preceding description of the preferred embodiment, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A control valve for precisely metering gaseous media, wherein the gaseous media is throttled between two parallel surfaces, which define a portion of a flow path through the valve, such that the volumetric flow rate is linearly proportional to the pressure differential across the parallel surfaces, comprising:
   a valve housing having an inlet and an outlet;
   an orifice plate sealingly disposed in the flow path between the inlet and the outlet, said plate having an orifice and a first surface extending outwardly along the plate from the orifice;
   a poppet disposed adjacent said orifice plate, said poppet having a surface which extends adjacent and substantially parallel to said first surface of the orifice plate;
   operating means for positioning the poppet relative to the orifice plate to open, close and meter the flow of the gaseous media; and
   alignment means for aligning the surface of the poppet to the first surface of the orifice plate when the valve is closed so as to maintain said surfaces in substantially parallel relation, said operating means includes a stem, said stem having a spherical portion in continuous engagement with said poppet, whereby there is no separative movement between said poppet and said spherical portion.

2. A control valve according to claim 1, wherein said orifice plate is fixedly mounted in said flow path, and wherein said alignment means comprises means for attaching the poppet to the operating means such that said surface of the poppet is free to move in more than one plane relative to the first surface of the orifice plate.

3. A control valve according to claim 1, wherein said orifice plate comprises a substantially flat disc-like plate sealingly mounted to the valve housing along its periphery, and having an orifice formed in the approximate center thereof.

4. A control valve according to claim 3, wherein said poppet has a substantially flat disc-like portion disposed adjacent the first surface of the orifice plate, and wherein said poppet is attached to a movable stem extending from said operating means.

5. A control valve according to claim 1, further comprising calibration means for adjusting the relative positions of the poppet and orifice plate to calibrate the flow of gaseous media through the valve.

6. A control valve according to claim 5, wherein said calibration means is externally accessible so as to allow the valve to be adjusted or calibrated without disassembly or access to internal components of the valve.

7. A control valve according to claim 1, wherein said operating means comprises an electrically powered proportional solenoid.

8. A control valve according to claim 7, wherein the flow rate through the valve is adjusted by varying an electrical current source connected to the solenoid.

9. A control valve according to claim 1, further comprising pressure balancing means for counteracting the effects of pressure variations upstream or downstream of said surfaces on the relative positioning of said surfaces.

10. A control valve according to claim 9, wherein said pressure balancing means comprises a diaphragm operatively connected to the poppet and responsive to said pressure variations.

11. A control valve according to claim 1, wherein said operating means comprises a stem extending through the poppet and the orifice plate, and wherein said poppet is attached to a portion of said stem and is movable therewith to open, close and meter the flow of gaseous media through the valve.

12. A control valve according to claim 11, wherein said poppet is attached to a spherical portion of said stem so as to be able to swivel relative to the stem and orifice plate.

13. A control valve according to claim 11, further comprising pressure balancing means for counteracting the effects of pressure variations upstream or downstream of said surfaces on the relative positioning of said surfaces.

14. A control valve according to claim 13, wherein said pressure balancing means comprises a first diaphragm operatively connected to the stem upstream of the poppet and a second diaphragm operatively connected to the stem downstream of the poppet.

15. A control valve for precisely metering gaseous media, wherein the gaseous media is throttled between two parallel surfaces, which define a portion of a flow path through the valve, such that the volumetric flow rate is linearly proportional to the pressure differential across the parallel surfaces, comprising:
a valve having an inlet and an outlet;
an orifice plate sealingly disposed in the flow path between the inlet and the outlet, said plate having an orifice and a first surface extending outwardly along the plate from the orifice;
a poppet disposed adjacent said orifice plate, said poppet having a surface which extends adjacent and substantially parallel to said first surface of the orifice plate;
operating means for positioning the poppet relative to the orifice plate to open, close and meter the flow of the gaseous media; and
alignment means for aligning the surface of the poppet to the first surface of the orifice plate when the valve is closed so as to maintain said surface in substantially parallel relation,
said operating means includes a stem extending through the poppet and the orifice plate, and wherein said poppet is attached to a portion of said stem and is movable therewith to open, close and meter the flow of gaseous media through the valve, said poppet is attached to a spherical portion of said stem so as to be able to swivel relative to the stem and orifice plate.

16. A control valve for precisely metering gaseous media, wherein the gaseous media is throttled between two parallel surfaces, which define a portion of a flow path through the valve, such that the volumetric flow rate is linearly proportional to the pressure differential across the parallel surfaces, comprising:
a valve having an inlet and an outlet;
an orifice plate sealingly disposed in the flow path between the inlet and the outlet, said plate having an orifice and a first surface extending outwardly along the plate from the orifice;
a poppet disposed adjacent said orifice plate, said poppet having a surface which extends adjacent and substantially parallel to said first surface of orifice plate;
operating means for positioning the poppet relative to the orifice plate to open, close and meter the flow of the gaseous media;
alignment means for aligning the surface of the poppet to the first surface of the orifice plate when the valve is closed so as to maintain said surface in substantially parallel relation;
said operating means includes a stem extending through the poppet and the orifice plate, and wherein said poppet is attached to a portion of said stem and is movable therewith to open, close and meter the flow of gaseous media through the valve; and
pressure balancing means for counteracting the effects of pressure variations upstream or downstream of said surfaces on the relative positioning of said surfaces, said pressure balancing means includes a first diaphragm operatively connected to the stem upstream of the poppet and a second diaphragm operatively connected to the stem downstream of the poppet.

17. A control valve according to claim 16, wherein said diaphragms generate forces on the stem in response to pressure variations of the gaseous flow which act in opposition to the forces extend on the stem by the poppet in response to said pressure variations.

* * * * *